United States Patent
Edirisooriya et al.

(10) Patent No.: US 10,810,138 B2
(45) Date of Patent: Oct. 20, 2020

(54) ENHANCED STORAGE ENCRYPTION WITH TOTAL MEMORY ENCRYPTION (TME) AND MULTI-KEY TOTAL MEMORY ENCRYPTION (MKTME)

(71) Applicant: Intel Corporation, Santa Clara, CA (US)

(72) Inventors: Samantha Edirisooriya, Tempe, AZ (US); Robert Z. Papp, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 250 days.

(21) Appl. No.: 16/008,418

(22) Filed: Jun. 14, 2018

(65) Prior Publication Data

US 2019/0042474 A1    Feb. 7, 2019

(51) Int. Cl.
| | |
|---|---|
| H04L 29/00 | (2006.01) |
| G06F 12/14 | (2006.01) |
| G06F 21/78 | (2013.01) |
| G06F 21/60 | (2013.01) |
| G06F 3/06 | (2006.01) |
| G06F 13/42 | (2006.01) |
| G06F 21/85 | (2013.01) |

(52) U.S. Cl.
CPC ........ *G06F 12/1408* (2013.01); *G06F 3/0623* (2013.01); *G06F 3/0634* (2013.01); *G06F 3/0659* (2013.01); *G06F 3/0661* (2013.01); *G06F 3/0673* (2013.01); *G06F 3/0679* (2013.01); *G06F 13/4221* (2013.01); *G06F 21/602* (2013.01); *G06F 21/78* (2013.01); *G06F 21/85* (2013.01); *G06F 2213/0026* (2013.01)

(58) Field of Classification Search
CPC .... G06F 12/1408; G06F 21/606; G06F 21/78; G06F 21/85; G06F 12/0246
See application file for complete search history.

(56) References Cited

U.S. PATENT DOCUMENTS

| | | | | |
|---|---|---|---|---|
| 2007/0050642 A1* | 3/2007 | Flynn | ............ | G06F 21/78 |
| | | | | 713/192 |
| 2008/0065906 A1* | 3/2008 | Itagaki | ............ | G06F 21/80 |
| | | | | 713/193 |
| 2008/0229118 A1* | 9/2008 | Kasako | ............ | G06F 21/80 |
| | | | | 713/193 |

* cited by examiner

*Primary Examiner* — Ghazal B Shehni
(74) *Attorney, Agent, or Firm* — Compass IP Law, PC (57) ABSTRACT

This disclosure is directed to a processing device including a memory to store data, processing circuitry to process data, the processing circuitry including a memory controller to control access to the memory and encryption circuitry to encrypt and decrypt data, and I/O circuitry. The I/O circuitry includes an I/O port to write data to a storage device and to read data from the storage device and an enable encryption bit associated with the I/O port, the I/O port to receive a request to read data from the memory, to send a read command to the memory controller with an enable encryption attribute set when the enable encryption bit is set, and to send a read command to the memory controller with the enable encryption attribute not set when the enable encryption bit is not set. The memory controller is configured to get the data from the memory, to forward the data to the I/O port without decrypting the data when the enable encryption attribute is set, and to cause the encryption circuitry to decrypt the data and to forward the decrypted data to the I/O port when the enable encryption attribute is not set.

17 Claims, 4 Drawing Sheets

ENHANCED STORAGE ENCRYPTION WITH TOTAL MEMORY ENCRYPTION (TME) AND MULTI-KEY TOTAL MEMORY ENCRYPTION (MKTME)

TECHNICAL FIELD

The present disclosure relates to device security, and more particularly, to a system for implementing encryption and decryption of data in memory and storage devices.

BACKGROUND

Electronic data security has become an area of great focus for development as more daily transactions become computerized. Computing devices are constantly being utilized to exchange financial data, personal identification data, etc. As a result, hackers may attempt to compromise computing devices to gain access to this valuable information. For example, malicious software (e.g., malware) may be loaded to passively or actively attack computing devices. Passive attacks may comprise malware observing data being passed between a processor and a memory to obtain passwords or other sensitive or confidential data. Active attacks may involve altering data stored in memory to trigger an atypical result such as allowing an unpermitted user to gain access to the computing device. In either instance, plaintext (unencrypted) data in the memory of a computing device that is exchanged with a processor in the computing device is a major vulnerability.

Virtualized computing environments may offer some inherent protection from the above attacks. For example, a virtualized device may comprise at least one virtual machine (VM). The VM is a software-based execution environment that emulates actual device hardware. Each VM may emulate multiple physical devices within a single device. An example implementation may include a virtual machine manager (VMM) or "hypervisor" to control at least one "trusted" VM or trusted execution environment (TEE) and at least one untrusted VM. The TEE may provide a protected environment in which software may execute without being exposed to potential attacks from malicious software (malware). While a TEE may offer strong protection, it may not be feasible to execute operational software for an entire device from within the TEE. This exposes other potential points of attack (e.g., attack vectors) that make up an attack surface for the device. Hardware and software developers seek to better protect devices by reducing the attack surface.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Some Operating Systems (OSs) have the ability to provide "secure virtual memory" meaning that anything from memory that is swapped out to a storage device (such as a hard disk drive (HDD), solid-state drive (SSD), optical disk drive, and so on) is encrypted. This feature improves security by making sure no data is ever written to the storage device unencrypted. However, the memory and the memory interface are typically not protected with any encryption. Also, these encryption/decryption operations are typically done in software running on a host central processing unit (CPU), thus adding increased transaction latency especially when reading data from the storage device and decrypting the data before ting the data to memory.

Embodiments consistent with the present disclosure make reference to various technologies such as, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions, available at https: //software.intel.com/sites/default/files/managed/a5/16/ Multi-Key-Total-Memory-Encryption-Spec.pdf), components that make up TME and MKTME, the manner in which TME and MKTME operate, etc. These technologies have been employed herein to provide a readily comprehensible perspective for understanding the various disclosed embodiments and are not intended to limit implementations to employing only TME and MKTME. TME provides a mechanism to encrypt data on the memory interfaces. The memory controller encrypts the data flowing out on the memory interfaces to the memory and decrypts data flowing in from memory and provides plain text for internal consumption by the processor.

TME is a technology that encrypts a device's entire memory with a single key. TME, when enabled via basic I/O system (BIOS) configuration, will help ensure that all memory accessed by a processor on an external memory bus is encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses is encrypted and is only in plain text while inside the processor circuitry. This allows existing software to run unmodified while protecting memory using TME. There may be scenarios where it would be advantageous to not encrypt a portion of memory, so TME allows the BIOS to specify a physical address range of memory to remain unencrypted. The software running on a TME-capable system has full visibility into all portions of memory that are configured to not be encrypted by TME. This is accomplished by reading a configuration register in the processor.

In an embodiment, further technology extends TME to support multiple encryption keys (Multi-Key TME, or MKTME) and provides the ability to specify the use of a specific key for a page of memory. This architecture allows either processor-generated keys or tenant-provided keys, giving full flexibility to customers. This means VMs and containers can be cryptographically isolated from each other in memory with separate encryption keys, an advantage in multi-tenant cloud environments. VMs and containers can also be pooled to share an individual key, further extending scale and flexibility. This includes support for both standard dynamic random-access memory (DRAM) and non-volatile random-access memory (NVRAM).

TME/MKTME together with "secure virtual memory" provide complete end-to-end protection of data when memory pages are moved back-and-forth between memory and storage.

However, when pages are swapped in and out of memory, plain text data is exposed on external storage device interfaces such as Peripheral Component Interface express (PCIe), serial AT attachment (SATA), universal flash storage (UFS), etc., unless the OS intervenes and encrypts the data before writing to storage drives. Having the OS involved in this results in decreased performance for the system. In response, embodiments of the present invention provide a mechanism to protect data moving between and within both memory and storage devices using TM/MKTME without the involvement of the OS.

This disclosure is directed to providing encryption of data in memory and storage devices in a cryptographic protection system. A device, or devices, uses data protected by an encryption system. Main memory in the device stores data for maintaining the integrity of an OS and other data for protecting applications, drivers, utilities, etc. The data in the main memory may be encrypted utilizing an encryption system. Consistent with the present disclosure, circuitry is capable of determining when data read from memory is to be stored in a storage device. For example, the circuitry comprises memory controller logic that monitors one or more indicators set for input/output (I/O) interfaces and may bypass certain data encryption or decryption operations based on the indicator settings. In embodiments of the present invention, reading encrypted data from memory and storing the encrypted data into storage devices may be performed in circuitry without involvement of the OS, thereby improving system throughput and overall system security.

Embodiments of the present invention overcome the issue of OS involvement by adding a configuration register or a field having at least one bit to an existing configuration in PCIe Root Ports and PCIe Integrated Endpoints, to provide an additional attribute for transactions generated by PCIe Root Ports and PCIe Integrated Endpoints. Based on this attribute, a memory controller can decide whether to encrypt outgoing data on a memory interface, or to decrypt incoming data from memory before forwarding the data to PCIe Root Ports and PCIe Integrated Endpoints. This feature can be used to prevent unencrypted data from leaving a system on chip (SOC) on the storage interfaces, when TME/MKTME is enabled.

The inclusion of an apostrophe after an item number (e.g., 100') in drawing figures within the present disclosure indicates that an example embodiment of the particular item is being illustrated. The examples are shown merely for the sake of explanation.

As referenced herein "cryptographic protection" may generally comprise protecting the confidentiality of data stored within a memory location or range of memory range by encrypting the data stored in the memory location or range and controlling access to the data by managing access to at least one cryptographic key for use in encrypting/decrypting data read from/written to the memory range. The terms "VMM" and "hypervisor" may be used interchangeably herein to reference to a virtual machine manager.

Figure 1:
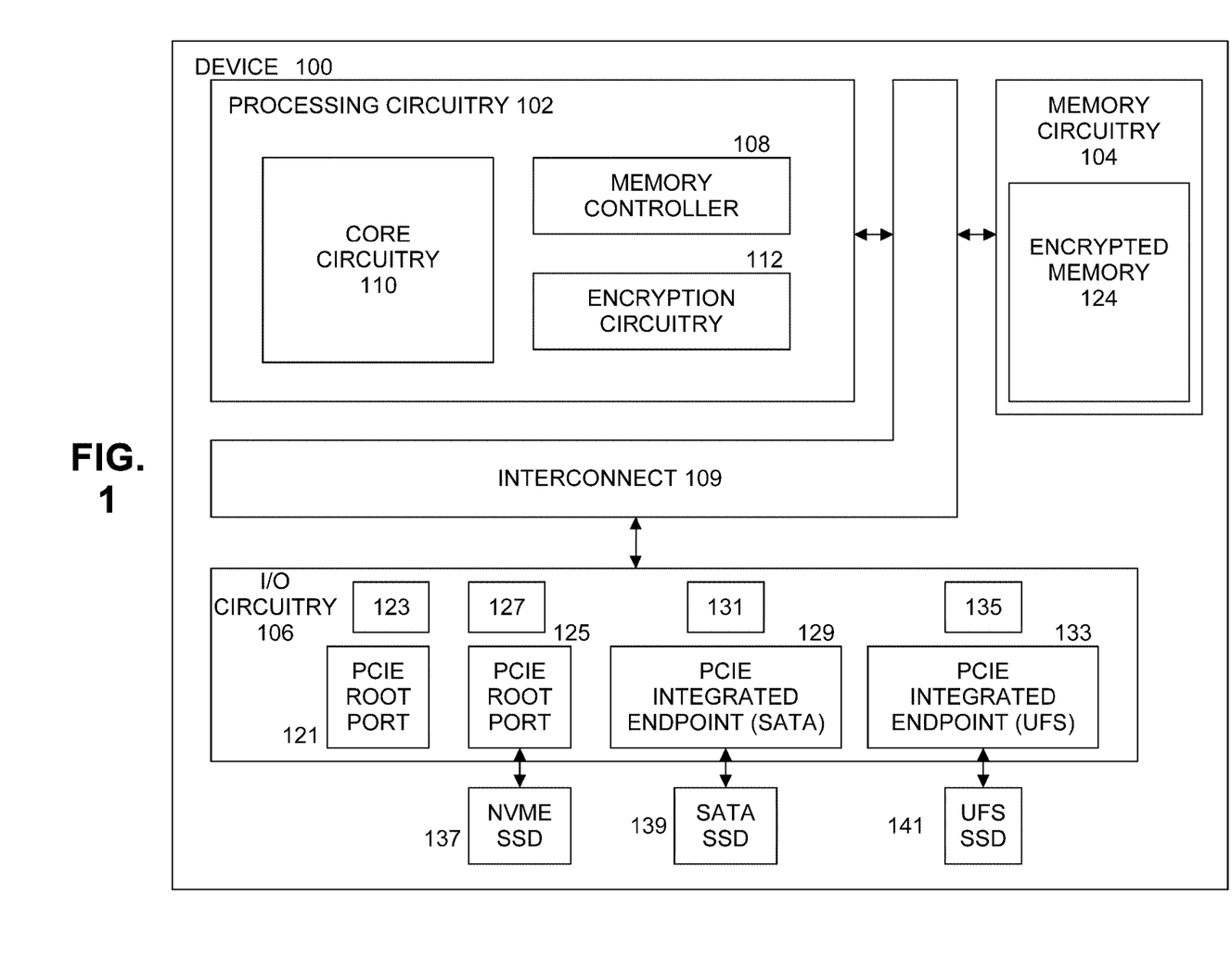
FIG. 1 illustrates an example of a device equipped with memory and storage encryption in a cryptographic protection system in accordance with at least one embodiment of the present disclosure.

FIG. 1 illustrates an example of a device 100 equipped to provide encryption of data for storing in memory and storage devices in a cryptographic protection system in accordance with at least one embodiment of the present disclosure. Device 100 may be any apparatus equipped with computing resources (e.g., resources for processing data). In one embodiment, device 100 is a system on a chip (SOC). While device 100 has been illustrated as contiguous in FIG. 1, device 100 may actually be made up of separate devices (e.g., coupled via wired or wireless communication). The devices making up device 100 may be configured to operate collaboratively such as, for example, in the instance of a desktop or laptop computer that may include a central processing unit (CPU) or processor that is coupled to a separate monitor, peripheral devices, etc., a server rack comprising a plurality of data servers, etc. Examples of device 100 may also include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television, digital video recorder (DVR), or other "smart" device, small form factor computing solutions (e.g., for space-limited applications, TV set-top boxes, etc.) like the Next Unit of Computing (NUC) platform from the Intel Corporation, etc.

Device 100 comprises, for example, processing circuitry 102, memory circuitry 104, I/O circuitry 106, and interconnect 109. In general operation, processing circuitry 102 performs actions that manipulate the data stored in memory circuitry 104. I/O circuitry 106 generates data (e.g., from user interaction) or receives data (e.g., from a network source or storage device) to store in memory circuitry 104 via direct memory access (DMA) and/or access data in memory circuitry 104 via DMA (e.g., for presentation to a user). Interconnect 109 comprises interconnect fabric circuitry to control how data is conveyed on the bus or buses (not shown in FIG. 1) that couple processing circuitry 102, memory circuitry 104 and I/O circuitry 106. For example, in a Peripheral Component Interconnect Express (PCIe) system, interconnect 109 includes at least one port and a switch fabric made up of switch devices to generate transaction requests for processing circuitry 102.

Processing circuitry 102 comprises memory controller circuitry 108, core circuitry 110 and encryption circuitry 112. Memory controller 108 controls access to read data from and/or write data to memory circuitry 104. Core circuitry 110 comprises at least one processing core to process data stored in memory circuitry 104 and/or one or more caches (not shown). Encryption circuitry 112 is generally configured to encrypt plaintext data (e.g., unencrypted data) prior to storage in memory circuitry 104, and to decrypt previously encrypted data prior to the data being processed by core circuitry 110, the data being DMA'd to another location in device 100, stored in a storage device, etc. In an embodiment, encryption circuitry 112 includes circuitry implementing TME and/or MKTME. In general, memory controller 108 and interconnect 109 control the data flowing from core circuitry 110 and/or I/O circuitry 106 to memory circuitry 104, and vice versa. When performing this function, memory controller 108 routes data to be stored in memory circuitry 104 through encryption circuitry 112, as appropriate, to be encrypted prior to storage in memory circuitry 104, or causes encryption circuitry 112 to be skipped when the data has already been encrypted. In this manner, the memory controller ensures that redundant encryption is avoided. Memory controller 108 routes data received from memory circuitry 104 through encryption circuitry 112 to decrypt encrypted data as directed. Decrypted data may be processed by core circuitry 110 or transferred over an I/O interface via I/O circuitry 106. In some cases, memory controller 108 leaves the data in encrypted form before transferring the encrypted data over an I/O interface via I/O circuitry 106. Further details as to how these operations may be performed are disclosed below regarding FIGS. 2 to 4.

Memory 104 may allow for protection at runtime for lower privilege software like an OS, applications, utilities, drivers, etc. In at least one embodiment, data within memory 104 may be encrypted as encrypted memory 124 according to TME and MKTME techniques implemented in processing circuitry 102 (including encryption circuitry 112) in known ways. TME may encrypt at least a portion of memory 104 (e.g., physical memory) of device 100 as encrypted memory 124. Encrypted memory 124 may protect against lost or stolen systems (e.g., wherein an attacker has physical access to the system) being compromised. In this scenario, without the memory being encrypted, an attacker may be able to retrieve sensitive user information including, for example, keys used for disk decryption of data in storage devices.

In some known implementations supporting TME/MKTME where the device is a SOC, an encryption engine is in the direct data path to external memory buses and therefore all of the memory data entering and/or leaving the device on memory buses is encrypted. The data inside the device (in caches, etc.) remains plain text and therefore supports existing software and I/O models. One disadvantage of the TME/MKTME mechanism is that when pages are swapped in and out of memory, plain text (unencrypted data) gets exposed on storage interfaces such as PCIe (and others) unless the OS explicitly encrypts/decrypts data during write/read operations.

This disadvantage is overcome in at least one embodiment by having memory controller 108 monitor one or more indicators that are set in various locations in I/O circuitry 106. Memory controller 108 determines whether to decrypt encrypted data read from memory 104 for transfer to a storage device based on the one or more indicators or to transfer the data as previously encrypted. In one embodiment, the one or more indicators may be one or more bits associated with each I/O interface. In one embodiment, the one or more indicators may be a portion of a register. For example, I/O circuitry 106 includes a peripheral component interconnect express (PCIe) root port 121. PCIe root port 121 is associated with enable encryption bit 123. When enable encryption bit 123 is set, memory controller 108 does not cause encryption circuitry 112 to decrypt previously encrypted data obtained from memory 104. Instead, the previously encrypted data is transferred to a storage device (not shown) coupled to PCIe root port 123. Thus, data is protected even while in transit from memory 104 through interconnect 109 to PCIe root port 121 and into a storage device. The data is protected throughout the transfer from memory to and within a storage device and vice versa.

When enable encryption bit 123 is not set, memory controller 108 causes encryption circuitry 112 to decrypt previously encrypted data obtained from memory 104. In this case, the data is transferred in plain text to the storage device over interconnect 109 and I/O circuitry 106. Note that in embodiments of the present invention, the OS or other software being executed by processor circuitry 102 are not involved in controlling the encryption or decryption of data being transferred between memory circuitry 104, processing circuitry 102, interconnect 109, I/O circuitry 106, and storage devices.

Similarly, I/O circuitry 106 include an enable encryption bit for each of one or more other I/O interfaces, such as PCI root port 125 (associated with enable encryption bit 127) attached to a non-volatile memory express (NVMe) solid-state drive (SSD) 137, PCI integrated endpoint for a serial AT attachment (SATA) 129 (associated with enable encryption bit 131) attached to a SATA SSD 139, PCI integrated endpoint for a universal flash storage (UFS) 133 (associated with an enable encryption bit 135) attached to UFS SSD 141, and so on. Although only a few examples of I/O interfaces and storage devices are shown in FIG. 1, it is understood that there may be any number of I/O interfaces and storage devices, or any types, in any given device. In an embodiment, when device 102 is a SOC, the storage devices may be external to the SOC. Since control of encryption and decryption is managed by memory controller 108, in embodiments of the present invention there is no need for any involvement or intervention by the OS. Thus, device performance is improved along with overall device security.

Figure 2:
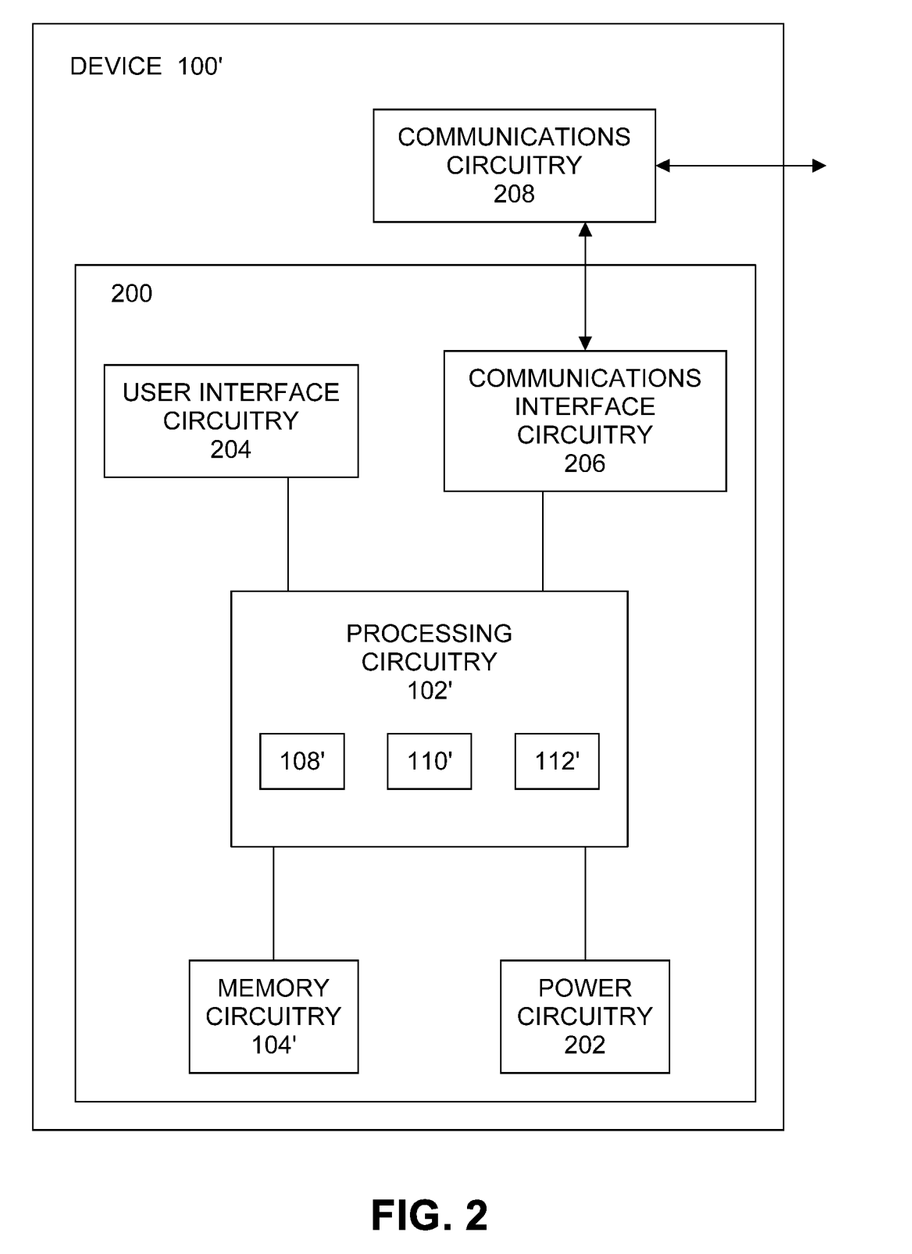
FIG. 2 illustrates an example configuration for a device usable in accordance with at least one embodiment of the present disclosure.

FIG. 2 illustrates an example configuration for a device usable in accordance with at least one embodiment of the present disclosure. Device 100' may be capable of performing any of the actions described above with respect to FIG. 1. However, device 100' is presented only as an example of an apparatus usable in embodiments consistent with the present disclosure and is not intended to limit any of the various embodiments to any particular manner of implementation.

Device 100' may comprise system circuitry 200 to manage device operations. System circuitry 200 may include, for example, processing circuitry 102', memory circuitry 104', power circuitry 202, user interface circuitry 204 and communication interface circuitry 206. Device 100' may further include communication circuitry 208. While communication circuitry 208 is illustrated as separate from system circuitry 200, the example configuration shown in FIG. 2 has been provided merely for the sake of explanation. Some or all of the functionality associated with communication circuitry 208 may also be incorporated into system circuitry 200.

In device 100', processing circuitry 102' may comprise one or more processors situated in separate components, or alternatively one or more processing cores (e.g., core circuitry 110') in a single component (e.g., in a system-on-a-chip (SoC)), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets configured to provide an interface through which processing circuitry 102' may interact with other system components that may be operating at different speeds, on different buses, etc. in device 100'. Moreover, some or all of the functionality commonly associated with the support circuitry may also be included in the same physical package as the processor.

Processing circuitry 102' may be configured to execute various instructions in device 100'. Instructions may include program code configured to cause processing circuitry 102' to perform activities related to reading data, writing data, processing data, formulating data, converting data, transforming data, etc. Information (e.g., instructions, data, etc.) may be stored in memory circuitry 104'. Memory circuitry 104' may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on basic input/output system (BIOS), unified extensible firmware interface (UEFI), etc. to provide instructions when device 100' is activated, programmable memories such as electronic programmable ROMs (EPROMS), flash memory, etc. Other fixed/removable memory may include, but are not limited to, example magnetic memories such as hard disk drives (HDDs), etc., example electronic memories such as solid-state flash memory (e.g., embedded multimedia card (eMMC), etc.), removable memory cards or sticks (e.g., micro storage device (uSD), USB, etc.), example optical memories such as compact disc-based ROM (CD-ROM), Digital Video Disks (DVD), Blu-Ray Disks, etc.

Power circuitry 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 204 may be incorporated within device 100' and/or may be coupled to device 100' via a wired or wireless communication medium. User interface circuitry 204 may be optional in certain circumstances such as, for example, a situation wherein device 100' is a server (e.g., rack server, blade server, etc.) that does not include user interface circuitry 204, and instead relies on another device (e.g., a management terminal) for user interface functionality.

Communication interface circuitry 206 may be configured to manage packet routing and other control functions for communication circuitry 208, which may be configured to support wired and/or wireless communications. In some instances, device 100' may comprise more than one set of communication circuitry 208 (e.g., including separate physical interface circuitry for wired protocols and/or wireless radios) managed by communication interface circuitry 206. Wired communications may include serial and parallel wired mediums such as, for example, Ethernet, USB, FireWire®, Thunderbolt™, Digital Video Interface (DVI), High-Definition Multimedia Interface (HDMI), DisplayPort™, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth®, WLAN, Wi-Fi, etc.), long range wireless mediums (e.g., cellular wide-area radio communication technology, satellite-based communications, etc.), electronic communications via sound waves, long-range optical communications, etc. In one embodiment, communication interface circuitry 206 may be configured to prevent wireless communications that are active in communication circuitry 208 from interfering with each other. In performing this function, communication interface circuitry 206 may schedule activities for communication circuitry 208 based on, for example, the relative priority of messages awaiting transmission. While the embodiment disclosed in FIG. 2 illustrates communication interface circuitry 206 being separate from communication circuitry 208, it may also be possible for the functionality of communication interface circuitry 206 and communication circuitry 208 to be incorporated into the same circuitry.

The various examples of circuitry described in conjunction with different embodiments of the present disclosure may comprise hardware, or combinations of hardware and software in which, for example, the software may be implemented by the hardware to then configure certain functionality in the hardware, configure the hardware to perform one or more specific operations, configure other hardware, etc. For example, at least a portion of memory controller 109', core circuitry 110' and encryption circuitry 112' may reside in processing circuitry 102'. Memory controller 108', core circuitry 110' and encryption circuitry 112' may comprise only hardware or a combination of hardware and software. For example, program code for memory controller 108', core circuitry 110' and/or encryption circuitry 112' may be stored in NV memory within memory circuitry 104'. The program code may then be used to load any or all of memory controller 108', core circuitry 110' and encryption circuitry 112' into volatile memory (e.g., RAM) during operation of device 100'. For example, processing circuitry 102' may execute the program code to transform processing circuitry 102' from general purpose data processing circuitry (e.g., a microprocessor) into specialized circuitry to perform various operations such as described herein. Memory controller 108' may then handle data transaction requests generated by core circuitry 110', and some or all of the data involved in the transaction requests may be encrypted or decrypted by encryption circuitry 112'.

Figure 3:
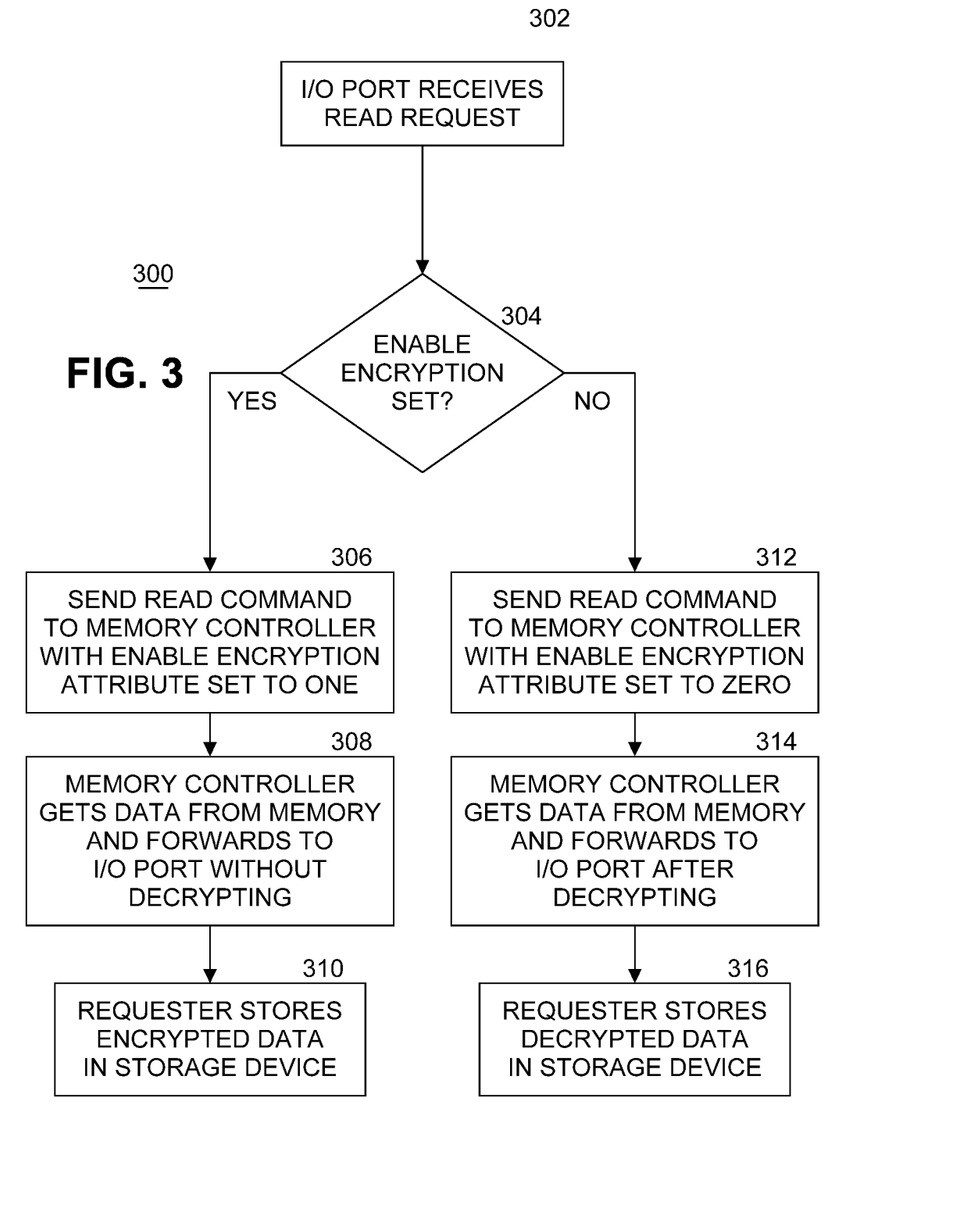
FIG. 3 illustrates example operations for handling a request to read data from memory in accordance with at least one embodiment of the present disclosure.

FIG. 3 illustrates example operations for handling a request to read data from memory 104 in accordance with at least one embodiment of the present disclosure. Initially, I/O port of I/O circuitry 106 such as PCIe root port 121, PCIe root port 125, PCIe integrated endpoint 131, or PCIe integrated endpoint 133 in I/O circuitry 106 within device 100 receives a read request at block 302. At block 304, if an enable encryption bit associated with the I/O port is set, then in an embodiment the I/O circuitry sends a read command at block 306 to memory controller 108 in processor circuitry 102 with an enable encryption attribute set to one. In an embodiment, the read command points to the data to be transferred. In other embodiments, other values may be used for the enable encryption attribute to indicate that data should stay encrypted and not be decrypted as part of the read operation. Next, at block 308, memory controller 108 gets the requested data from memory 104 and forwards the data to the I/O circuitry via the requesting I/O port without decrypting the data. At block 310, the requester, such as a storage device (e.g., NVMe SSD 137, SATA SSD 139, UFS SSD 141, and so on), stores the encrypted data in the storage device. Since the data is still encrypted, the data is secure while in transit over the PCIe bus, and while stored in the storage device.

At block 304, if an enable encryption bit associated with the I/O port is not set, then in an embodiment the I/O circuitry sends a read command at block 312 to memory controller 108 in processor circuitry 102 with an enable encryption attribute set to zero. In an embodiment, the read command points to the data to be transferred. In other embodiments, other values may be used for the enable encryption attribute to indicate that data should be decrypted as part of the read operation. Next, at block 314, memory controller 108 gets the requested data from memory 104, decrypts the data, and forwards the decrypted data to the I/O circuitry via the requesting I/O port. At block 316, the requester, such as a storage device (e.g., NVMe SSD 137, SATA SSD 139, UFS SSD 141, and so on), stores the decrypted data in the storage device. Since the data has been decrypted, the data is in the clear (e.g., plain text) while in transit over the PCIe bus, and while stored in the storage device.

Figure 4:
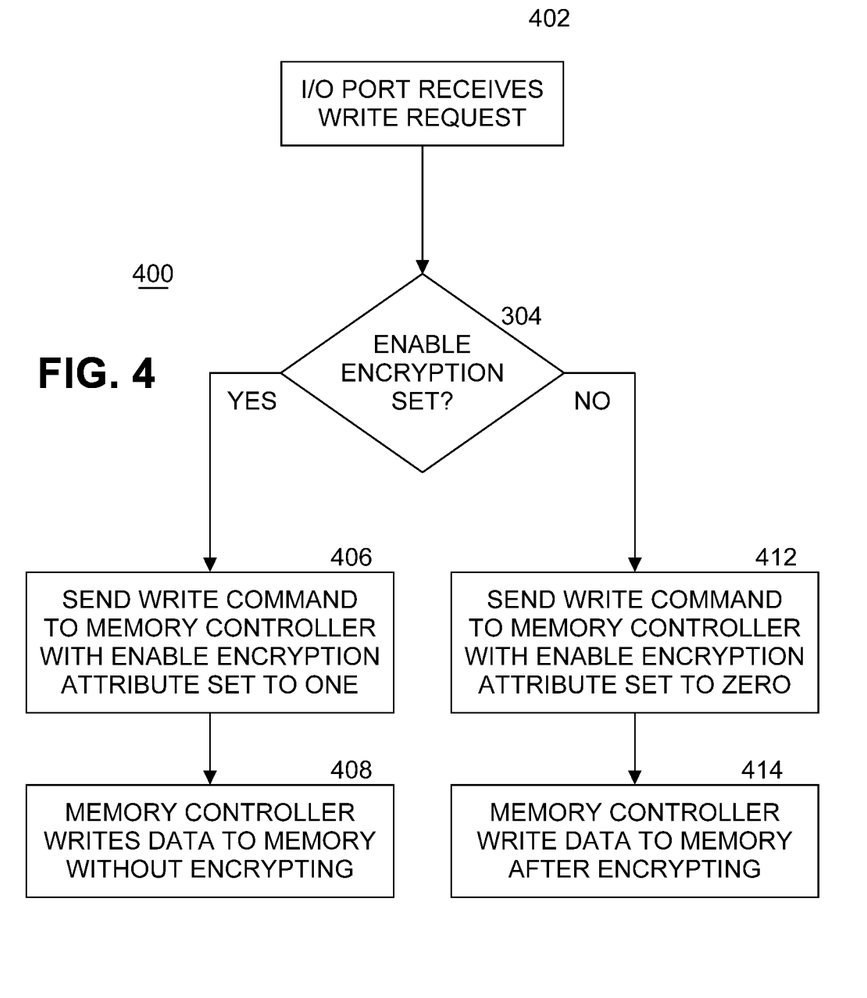
FIG. 4 illustrates example operations for handling a request to write data to memory in accordance with at least one embodiment of the present disclosure.

FIG. 4 illustrates example operations for handling a request to write data to memory 104 in accordance with at least one embodiment of the present disclosure. Initially, an I/O port such as PCIe root port 121, PCIe root port 125, PCIe integrated endpoint 131, or PCIe integrated endpoint 133 in I/O circuitry 106 within device 100 receives a write request at block 402. At block 404, if an enable encryption bit associated with the I/O port is set, then in an embodiment the I/O circuitry sends a write command at block 406 to memory controller 108 in processor circuitry 102 with an enable encryption attribute set to one. In an embodiment, the write command points to the data to be transferred. In other embodiments, other values may be used for the enable encryption attribute to indicate that data should stay encrypted (as previously performed) and not be encrypted again as part of the write operation. Next, at block 408, memory controller 108 writes the data to memory 104 without encrypting the data before the write (since the data is already encrypted). Since the data is still encrypted, the data is secure while in transit over the PCIe bus, and while stored in the memory.

At block 404, if an enable encryption bit associated with the I/O port is not set, then in an embodiment the I/O circuitry sends a write command at block 412 to memory controller 108 in processor circuitry 102 with an enable encryption attribute set to zero. In an embodiment, the write command points to the data to be transferred. In other embodiments, other values may be used for the enable encryption attribute to indicate that data should be encrypted as part of the write operation. Next, at block 414, memory controller 108 gets encrypts the data and writes the newly encrypted data into the memory. Since the data was transferred in the clear over the PCIe bus, and the data is encrypted before being written to the memory.

Based on the foregoing disclosure, it will be understood that in embodiments of the present invention, data is protected by encryption using TME and/or MKTME throughout the device, including in memory, while being transferred over I/O interfaces, and while being stored by storage devices. Further, this cryptographic protection system may be implemented in device hardware without any involvement by the OS. Thus, security is provided that is better and more efficient than in known systems using OS-directed protections.

While FIGS. 3 and 4 illustrate operations according to different embodiments, it is to be understood that not all of the operations depicted in FIGS. 3 and 4 are necessary for other embodiments. Indeed, it is fully contemplated herein that in other embodiments of the present disclosure, the operations depicted in FIGS. 3 and 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

An advantage of the present disclosure is the ability of the device to prevent unencrypted data from leaving the device on storage interfaces (a problem that reduces the effectiveness of current TME/MKTME implementations). In addition, embodiments can eliminate the increased latencies and the additional memory bandwidth requirements associated with host-based decryption (i.e., OS managed decryption) when bringing a page to memory from a storage device. Furthermore, embodiments can eliminate the additional memory bandwidth requirements associated with host-based encryption (i.e., OS managed encryption) when moving data to a storage device from memory.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device comprising:
   a memory to store data;
   processing circuitry to process data, the processing circuitry including a memory controller in the processing circuitry to control access to the memory and encryption circuitry in the processing circuitry to encrypt and decrypt data; and
   I/O circuitry including an I/O port to write data to a storage device and to read data from the storage device and an enable encryption bit associated with the I/O port, the I/O port to receive a request to read data from the memory, to send a read command to the memory controller with an enable encryption attribute set when the enable encryption bit is set, and to send the read command to the memory controller with the enable encryption attribute not set when the enable encryption bit is not set;
   wherein the memory controller to get the data from the memory, to forward the data to the I/O port without decrypting the data when the enable encryption attribute is set, and to cause the encryption circuitry to decrypt the data and to forward the decrypted data to the I/O port when the enable encryption attribute is not set;
   wherein the I/O port to receive a request to write data to the memory, to send a write command to the memory controller with an enable encryption attribute set when the enable encryption bit is set, and to send the write command to the memory controller with the enable encryption attribute not set when the enable encryption bit is not set and
   wherein the memory controller to write the data to the memory without encrypting the data when the enable encryption attribute is set, and to cause the encryption circuitry to encrypt the data and to write the encrypted data to the memory when the enable encryption attribute is not set.

2. The device of claim 1, wherein the I/O port to send data to the storage device and to get data from the storage device.

3. The device of claim 1, wherein the I/O port comprises one of a Peripheral Component Interface express (PCIe) root port and a PCIe integrated endpoint.

4. The device of claim 1, wherein the processing circuitry comprises circuitry to implement total memory encryption (TME) and multi-key total memory encryption (MKTME) to encrypt and decrypt data stored in the memory.

5. The device of claim 1, wherein the device comprises a system on a chip (SOC).

6. The device of claim 1, wherein the storage device comprises a non-volatile memory express (NVMe) solid-state drive (SSD), a serial AT attachment (SATA) SSD, or a universal flash storage (UFS) SSD.

7. The device of claim 1, comprising interconnect circuitry to communicatively couple the memory, the processing circuitry, and the I/O circuitry, wherein data transferred over the interconnect circuitry is encrypted.

8. A system comprising:
   communications circuitry to support wired and/or wireless communications; and
   a system on a chip (SOC) coupled to the communications circuitry, the SOC including a memory to store data;
      processor circuitry to process data, the processing circuitry including a memory controller in the processing circuitry to control access to the memory and encryption circuitry in the processing circuitry to encrypt and decrypt data; and
      I/O circuitry including an I/O port to write data to a storage device and to read data from the storage device and an enable encryption bit associated with the I/O port, the I/O port to receive a request to read data from the memory, to send a read command to the memory controller with an enable encryption attribute set when the enable encryption bit is set, and to send the read command to the memory controller with the enable encryption attribute not set when the enable encryption bit is not set;
      wherein the memory controller to get the data from the memory, to forward the data to the I/O port without decrypting the data when the enable encryption attribute is set, and to cause the encryption circuitry to decrypt the data and to forward the decrypted data to the I/O port when the enable encryption attribute is not set;
      wherein the I/O port to receive a request to write data to the memory, to send a write command to the memory controller with an enable encryption attribute set when the enable encryption bit is set, and to send the write command to the memory controller with the enable encryption attribute not set when the enable encryption bit is not set; and wherein the memory controller to write the data to the memory without encrypting the data when the enable encryption attribute is set, and to cause the encryption circuitry to encrypt the data and to write the encrypted data to the memory when the enable encryption attribute is not set.

9. The system of claim 8, wherein the I/O port to send data to the storage device and to get data from the storage device.

10. The system of claim 8, wherein the I/O port comprises one of a Peripheral Component Interface express (PCIe) root port and a PCIe integrated endpoint.

11. The system of claim 8, wherein the processing circuitry comprises circuitry to implement total memory encryption (TME) and multi-key total memory encryption (MKTME) to encrypt and decrypt data stored in the memory.

12. The system of claim 8, wherein the storage device comprises a non-volatile memory express (NVMe) solid-state drive (SSD), a serial AT attachment (SATA) SSD, or a universal flash storage (UFS) SSD.

13. The system of claim 8, comprising interconnect circuitry to communicatively couple the memory, the processing circuitry, and the I/O circuitry, wherein data transferred over the interconnect circuitry is encrypted.

14. A method comprising:
  receiving, by an I/O port of I/O circuitry, the I/O port for writing data to a storage device and reading data from the storage device, a request to read data from a memory, sending a read command to a memory controller of processor circuitry coupled to the memory, the memory controller for controlling access to the memory, with an enable encryption attribute set when an enable encryption bit associated with the I/O port is set, and sending a the read command to the memory controller with the enable encryption attribute not set when the enable encryption bit is not set;
  getting, by the memory controller, the data from the memory, forwarding the data to the I/O port without decrypting the data when the enable encryption attribute is set, and causing encryption circuitry of the processing circuitry for encrypting and decrypting data to decrypt the data and forwarding the decrypted data to the I/O port when the enable encryption attribute is not set
  receiving, by the I/O port, a request to write data to the memory, sending a write command to the memory controller with an enable encryption attribute set when the enable encryption bit is set, and sending the write command to the memory controller with the enable encryption attribute not set when the enable encryption bit is not set and
  writing, by the memory controller, the data to the memory without encrypting the data when the enable encryption attribute is set, and causing the encryption circuitry to encrypt the data and writing the encrypted data to the memory when the enable encryption attribute is not set.

15. The method of claim 14, comprising, sending data to the storage device from the I/O port and getting data from the storage device to the I/O port.

16. The method of claim 14, comprising implementing, by the processing circuitry total memory encryption (TME) and multi-key total memory encryption (MKTME) to encrypt and decrypt data stored in the memory.

17. The method of claim 14, comprising transferring encrypted data over interconnect circuitry communicatively coupled to the memory, the processing circuitry, and the I/O circuitry.

* * * * *